US009275594B2

(12) United States Patent
Zhu et al.

(10) Patent No.: US 9,275,594 B2
(45) Date of Patent: Mar. 1, 2016

(54) DRIVING CIRCUIT OF LIQUID CRYSTAL PANEL, LIQUID CRYSTAL PANEL, AND A DRIVING METHOD

(71) Applicant: SHENZHEN CHINA STAR OPTOELECTRONICS TECHNOLOGY CO., LTD., Shenzhen (CN)

(72) Inventors: Jiang Zhu, Shenzhen (CN); Dongsheng Guo, Shenzhen (CN)

( * ) Notice: Subject to any disclaimer, the term of this patent is extended or adjusted under 35 U.S.C. 154(b) by 360 days.

(21) Appl. No.: 13/884,964

(22) PCT Filed: Apr. 7, 2013

(86) PCT No.: PCT/CN2013/073782
§ 371 (c)(1),
(2) Date: May 11, 2013

(87) PCT Pub. No.: WO2014/153792
PCT Pub. Date: Oct. 2, 2014

(65) Prior Publication Data
US 2014/0292731 A1 Oct. 2, 2014

(30) Foreign Application Priority Data
Mar. 29, 2013 (CN) .......................... 2013 1 0109279

(51) Int. Cl.
*G06F 3/038* (2013.01)
*G09G 3/36* (2006.01)

(52) U.S. Cl.
CPC ........ *G09G 3/3685* (2013.01); *G09G 2310/027* (2013.01); *G09G 2310/08* (2013.01); *G09G 2320/0223* (2013.01); *G09G 2370/08* (2013.01)

(58) Field of Classification Search
CPC ... G09G 3/3685; G09G 3/18; G09G 2370/08; G09G 2310/08; G09G 2310/027; G09G 2320/0223
See application file for complete search history.

(56) References Cited

U.S. PATENT DOCUMENTS 5,808,596 A * 9/1998 Kim ................................ 345/98
2005/0057480 A1 3/2005 Liao et al.
(Continued)

FOREIGN PATENT DOCUMENTS

CN 101398584 A 4/2009
CN 201716962 U 1/2011
(Continued)

OTHER PUBLICATIONS

Wang Mina, the International Searching Authority written comments, Jan. 2014, CN.

*Primary Examiner* — Michael Pervan
*Assistant Examiner* — Andrew Lee

(57) ABSTRACT

A liquid crystal (LC) panel includes a plurality of data lines and a plurality of leads connected to the data lines, the driving circuit of the LC panel includes a monitor module and a data-driving module, the data-driving module includes a data latch unit coupled to the lead of the LC panel. The monitor module outputs a time sequence signal to control the data latch unit to output a display signal to the data line. The driving circuit of the LC panel includes a delay unit corresponding to the data line, and the time sequence signal is sent to the data latch unit through the delay unit. When the delay unit reaches a preset delay time, the time sequence signal controls the data latch unit to the display signal to a corresponding data line, and a delay time of a delay unit coupled to a long lead of the LC panel is shorter than a delay time of a delay unit coupled to a short lead of the LC panel.

11 Claims, 7 Drawing Sheets

(56) References Cited

U.S. PATENT DOCUMENTS

| | | | | |
|---|---|---|---|---|
| 2007/0285370 | A1 | 12/2007 | Kim | |
| 2008/0055214 | A1* | 3/2008 | Kang et al. | 345/87 |
| 2010/0259516 | A1* | 10/2010 | Park et al. | 345/204 |
| 2012/0223927 | A1* | 9/2012 | Hsieh et al. | 345/211 |
| 2013/0141403 | A1* | 6/2013 | Shibuya | 345/204 |

FOREIGN PATENT DOCUMENTS

| | | | |
|---|---|---|---|
| CN | 102034414 | A | 4/2011 |
| CN | 102402957 | A | 4/2012 |
| CN | 102436798 | A | 5/2012 |
| CN | 103198803 | A | 7/2013 |

* cited by examiner

DRIVING CIRCUIT OF LIQUID CRYSTAL PANEL, LIQUID CRYSTAL PANEL, AND A DRIVING METHOD

TECHNICAL FIELD

The present disclosure relates to the field of a liquid crystal (LC) panel, and more particularly to a driving circuit of an LC panel, an LC panel, and a driving method.

BACKGROUND

In a liquid crystal (LC) panel, a data signal output by a data chip reaches a data line through a lead. As a number of an output channel of the data chip increases, length difference between length of leads of two ends of the LC panel and length of leads of a middle of the LC panel increases, thus difference in impedance increases, and the difference in impedance affects distortion of the data signal. Generally, to make the impedances of all leads be basically same when the data signal reaches each of pixels of the LC panel, an S-shaped lead is used. As shown in FIG. 1, a lead of a glass of the LC panel is compressed by a golden finger of a data-driving module packaged by a chip on film (COF), and the lead is connected to the coiling lead the pixel of the LC panel through coiling lead. Currently, a development direction of the LC panel is to reduce a width of a frame of the LC panel, thus reducing space of the coiling lead. With the number of the output channels of the data chip of the data-driving module increasing, using the S-shaped lead cannot reduce an impedance difference caused by a distance difference, thus time that a display signal output by the output channel of two ends of the data chip reaches the data line of the LC panel is more than the amount of time it takes for a display signal output by the output channel of the middle of the data chip to reach the data line of the LC panel. Thus, it is important to find another method to solve the above-described problem.

SUMMARY

In view of the above-described problems, the aim of the present disclosure is to provide a driving circuit of a liquid crystal (LC) panel, the LC panel, and a driving method capable of reducing a delay of a display signal and applying to multi-channel of the data-driving module.

The aim of the present disclosure is achieved by the following method.

A driving circuit of a liquid crystal (LC) panel, the LC panel comprising a plurality of data lines and a plurality of leads connected to the data lines, comprises a monitor module and a data-driving module, the data-driving module comprises a data latch unit coupled to the lead of the LC panel, the monitor module outputs a time sequence signal to control the data latch unit to output a display signal to the data line. The driving circuit of the LC panel further comprises a delay unit corresponding to the data line, and the time sequence signal is sent to the data latch unit through the delay unit. When the delay unit reaches a preset delay time, the delay unit controls the data latch unit to the display signal to output a corresponding data line. Length of the lead of the LC panel is inversely proportional to a delay time of the corresponding delay unit.

Furthermore, a pixel of the LC panel is coupled to the data line of the LC panel, and the delay unit controls the display signals output by all data latch units to simultaneously reach a same row of pixels of the LC panel, which reduces a delay of a signal and improves display quality.

Furthermore, the delay unit comprises a plurality of cascaded D triggers and a counter corresponding to the D trigger. An output end of each of the D triggers is coupled to one data latch unit, and is coupled to an input end of a next D trigger. A same clock pulse signal is sent to a triggering end of the D trigger through the counter. When the time sequence signal is at the high level, the D triggers of different grades successively generate the time sequence signal according to a frequency of the clock pulse signal. Pulse signals of the triggering end of the D trigger may be generated by the clock pulse signals correspondingly passing through the counters, thus different pulse signals may be generated by changing the counter, and the time sequence signals having different delay times are generated. The D trigger delays outputting signal, has good following performance, and is beneficial to reduce low cost, the delay output time of the D trigger may be freely set through the counter.

Furthermore, the data latch unit comprises a data temporary register and a digital-to-analog converter (DAC) module coupled to the data temporary register, the DAC module converts the display signal into an analog signal, and outputs the analog signal to the corresponding data line. This is a specific structure of the data latch unit.

Furthermore, when the time sequence signal is a high level, the display signal is sent to the DAC module from the data temporary register, when the time sequence signal is at a low level, the DAC module outputs a converted display signal to the corresponding data line. This is a method of using the low level to control the output of the display signal.

Furthermore, a pixel of the LC panel is coupled to the data line of the LC panel, and the delay unit controls the display signals output by all data latch units to simultaneously reach a same row of pixels of the LC panel. The delay unit comprises a plurality of cascaded D triggers and a counter corresponding to the D trigger. An output end of each of the D triggers is coupled to one data latch unit, and coupled to an input end of a next D trigger. A same clock pulse signal is sent to a triggering end of the D trigger through the counter. The data latch unit comprises a data temporary register and a digital-to-analog converter (DAC) module coupled to the data temporary register, the DAC module converts the display signal into an analog signal, and outputs the analog signal to the corresponding data line. When the time sequence signal is at a high level, the data temporary register sends the display signal to the DAC module; when the time sequence signal is at a low level, the DAC module outputs a converted display signal to the corresponding data line. This is a specific structure of the driving circuit of the LC panel.

A liquid crystal (LC) panel device comprises a driving circuit of an LC panel of the present disclosure.

A method for driving a driving circuit of a liquid crystal (LC) panel, the LC panel comprising a plurality of data lines, the driving circuit of the LC panel comprising a data-driving module coupled to the data line and a monitor module coupled to the data-driving module, the data-driving module comprising a delay unit and a data latch unit, the data latch unit corresponding to the data line, comprises:

A: sending a time sequence signal of the monitor module to the data latch unit through the delay unit; and B: converting the time sequence signal into a low level signal, sending the time sequence signal to the data latch unit, and controlling the data latch unit to output a display signal to a corresponding data line when the delay unit reaches a preset delay time, length of the lead of the LC panel is inversely proportional to a delay time of the corresponding delay unit.

Furthermore, the step B comprises: controlling the delay time of the delay unit, and controlling display signals output by all data latch units to simultaneously reach a same row of pixels of the LC panel. The delay of the signal is reduced, and the display quality is improved.

Furthermore, the step B comprises: using a D trigger to control the delay time. This is a specific circuit structure of the delay unit, and the D trigger delays outputting signal, has good following performance, and is beneficial to reduce low cost.

In research, data of each of all channels of an ordinary data-driving module is simultaneously outputted, namely display signal of each of all data latch units is simultaneously sent to the data line. As a length of the lead increases, a delay time of the display signal reaching the data line of the LC panel increases correspondingly, a charging time of a data column corresponding to the LC panel is reduced correspondingly. Generally, a typical data-driving module is controlled by the time sequence signal, in process comprising: the time sequence signal latches the display signal in the data latch unit at a rising edge of the time sequence signal, and then the time sequence signal controls the display signal to be sent to the LC panel at a falling edge of the time sequence signal. In view of the above-described characteristic of the time sequence signal, the present disclosure uses the delay unit to control when the time sequence signal reaches each of the data latch units at the falling edge. When the delay unit reaches the preset delay time, the time sequence signal is converted into a low level signal and is sent to the data latch unit, and the delay unit controls the data latch unit to output the display signal to the corresponding lead, then the display signal reaches the data line connected to the lead. The delay time of the delay unit coupled to the long lead of the LC panel is less than the delay time of the delay unit coupled to the short lead of the LC panel, which reduces a time difference that the display signals reach a same row of pixels of the LC panel, thereby reducing the delay of the display signal, and improving display quality. In addition, the present disclosure has no relation to a length of the lead, as long as the delay times of different delay units are controlled, the delay of the display signal may be improved, thus the present disclosure applies to multi-channel of the data-driving module.

DETAILED DESCRIPTION

Figure 3:
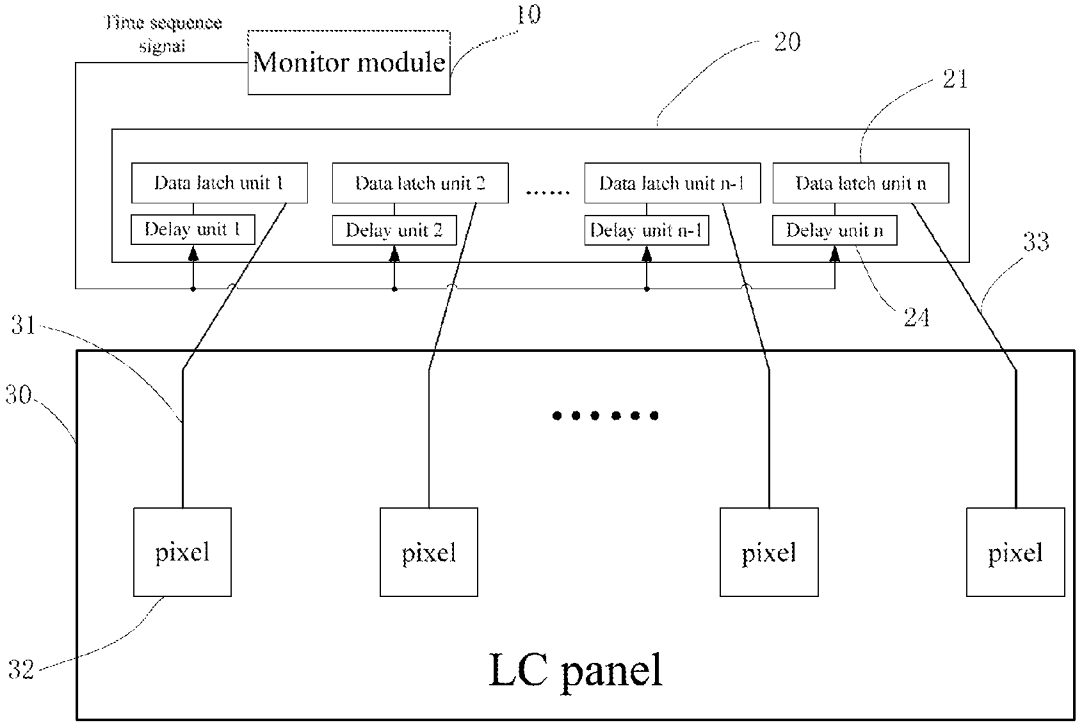
FIG. 3 is a schematic diagram of a driving circuit of a liquid crystal (LC) panel of the present disclosure.

As shown in FIG. 3, the present disclosure provides a driving circuit of a liquid crystal (LC) panel, the LC panel 30 comprises a plurality of data lines 31 and a plurality of leads 33 connected to the data lines 31. The driving circuit of the LC panel comprises a monitor module 10 and a data-driving module 20, and the data-driving module 20 comprises a data latch unit 21 corresponding to the lead 33 of the LC panel 30, the monitor module 10 outputs a time sequence signal to control the data latch unit 21 to output a display signal to the data line 31. The driving circuit of the LC panel further comprises a delay unit 24 corresponding to the data lines 31, where the time sequence signal is sent to the data latch unit 21 through the delay unit 24. When the delay unit 24 reaches a preset delay time, the delay unit 24 controls the data latch unit 21 to output the display signal to a corresponding data line 31, where a delay time of the delay unit 24 coupled to a long lead 33 of the LC panel is less than a delay time of the delay unit 24 coupled to a short lead 33 of the LC panel, namely length of the lead of the LC panel is inversely proportional to a delay time of the corresponding delay unit.

Figure 1:
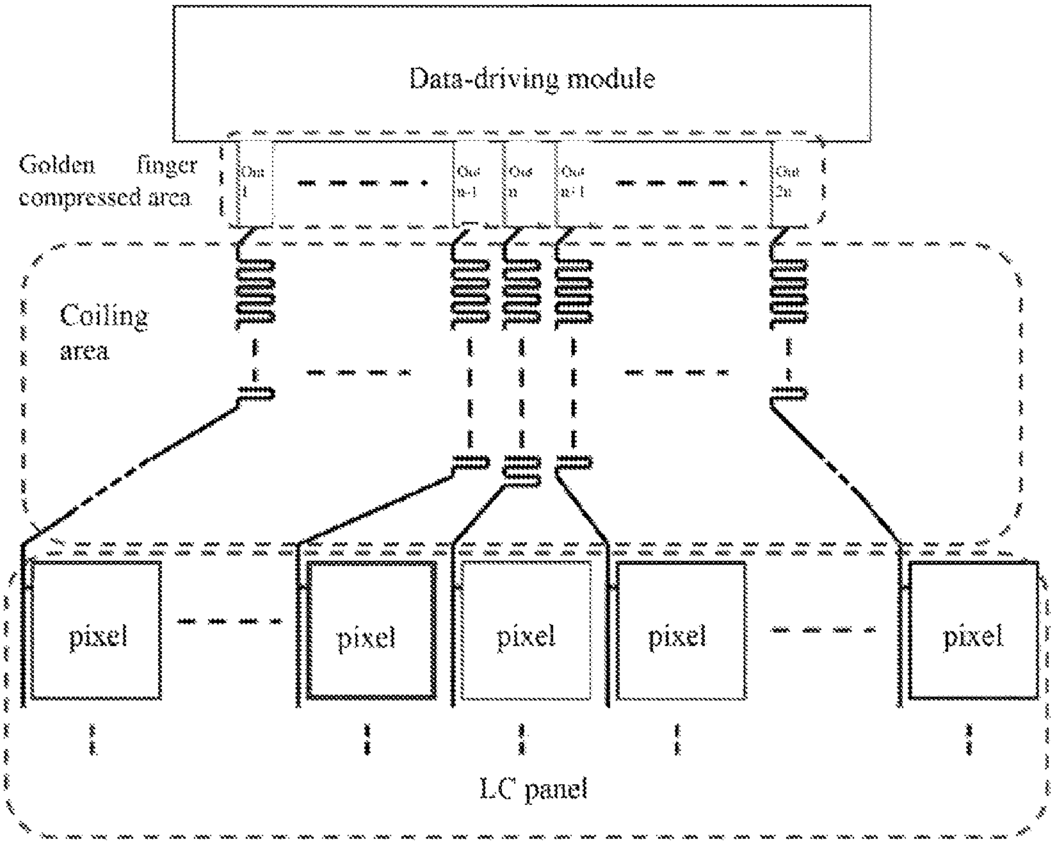
FIG. 1 PRIOR ART
FIG. 1 is a schematic diagram of a typical driving circuit of a liquid crystal (LC) panel.
Figure 2:
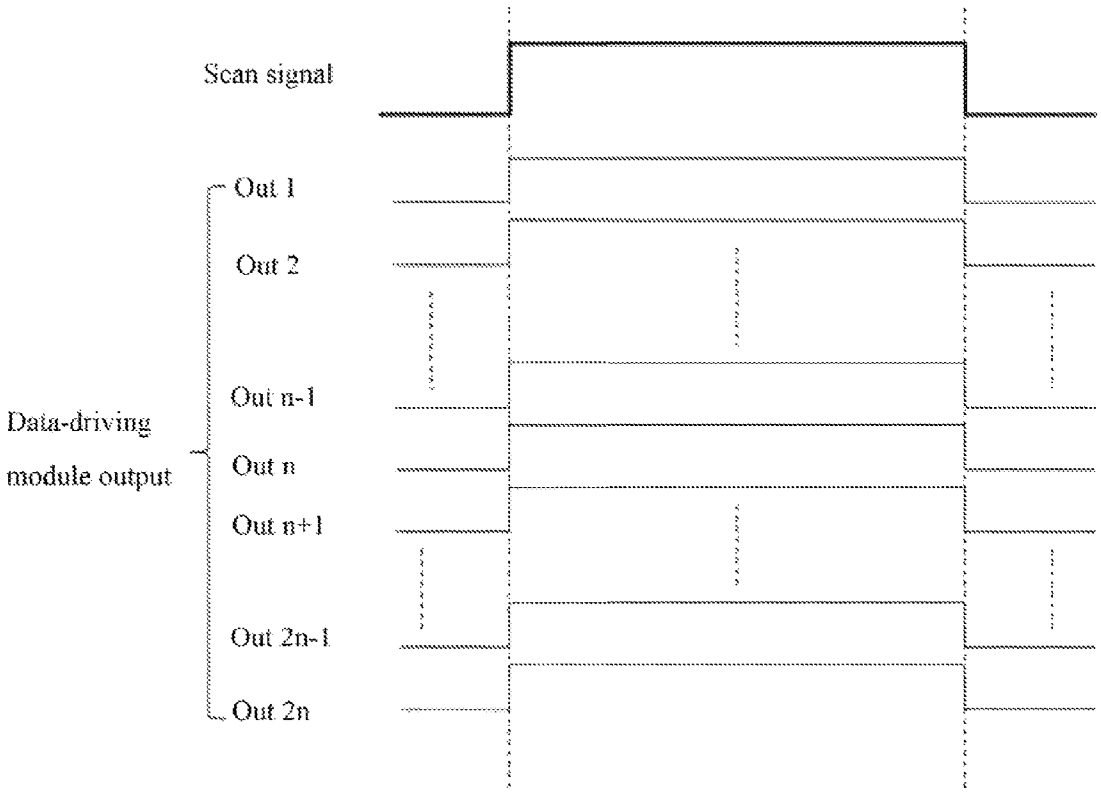
FIG. 2 PRIOR ART
FIG. 2 is a schematic diagram of a waveform output by a typical data-driving module.

In research, data of each of all channels of an ordinary data-driving module is simultaneously outputted, namely display signal of each of all data latch units is simultaneously sent to the data line, as shown in FIG. 2. If the data-driving module has 2n number of output channels, an nth output channel is the nearest channel from a data column, and an impedance of an nth lead reaching the data column is the smallest, left and right leads of the nth lead are symmetrically arranged, the impedances of the left and right leads are symmetrical and gradually increase from the nth lead to the leads at two ends. As the impedance of the lead increases, the delay time of the display signal reaching the data line of the LC panel increases correspondingly, and a charging time of the data column corresponding to the LC panel is reduced correspondingly. Generally, a typical data-driving module is controlled by the time sequence signal, in the process comprising: the time sequence signal latches the display signal in the data latch unit at a rising edge of the time sequence, and then the time sequence signal controls the display signal to be sent to the LC panel at a falling edge of the time sequence signal. In view of the above-described characteristic of the time sequence signal, the present disclosure uses the delay unit to control when the time sequence signal reaches each of the data latch units at the falling edge. When the delay unit reaches the preset delay time, the time sequence signal is converted into a low level signal (logic 0) and is sent to the data latch unit, and the delay unit controls the data latch unit to output the display signal to the corresponding lead, then the display signal reaches the data line connected to the lead. The delay time of the delay unit coupled to the long lead of the LC panel is less than the delay time of the delay unit coupled to the short lead of the LC panel, which reduces a time difference that the display signals reach a same row of pixels of the LC panel, thereby reducing the delay of the display signal, and improving display quality. In addition, the present disclosure has no relation to a length of the lead, as long as the delay times of different delay units are controlled, the delay of the display signal may be improved, thus the present disclosure applies to multi-channel of the data-driving module.

The present disclosure will further be described in detail in accordance with the figures and the exemplary examples.

EXAMPLE 1

Figure 4:
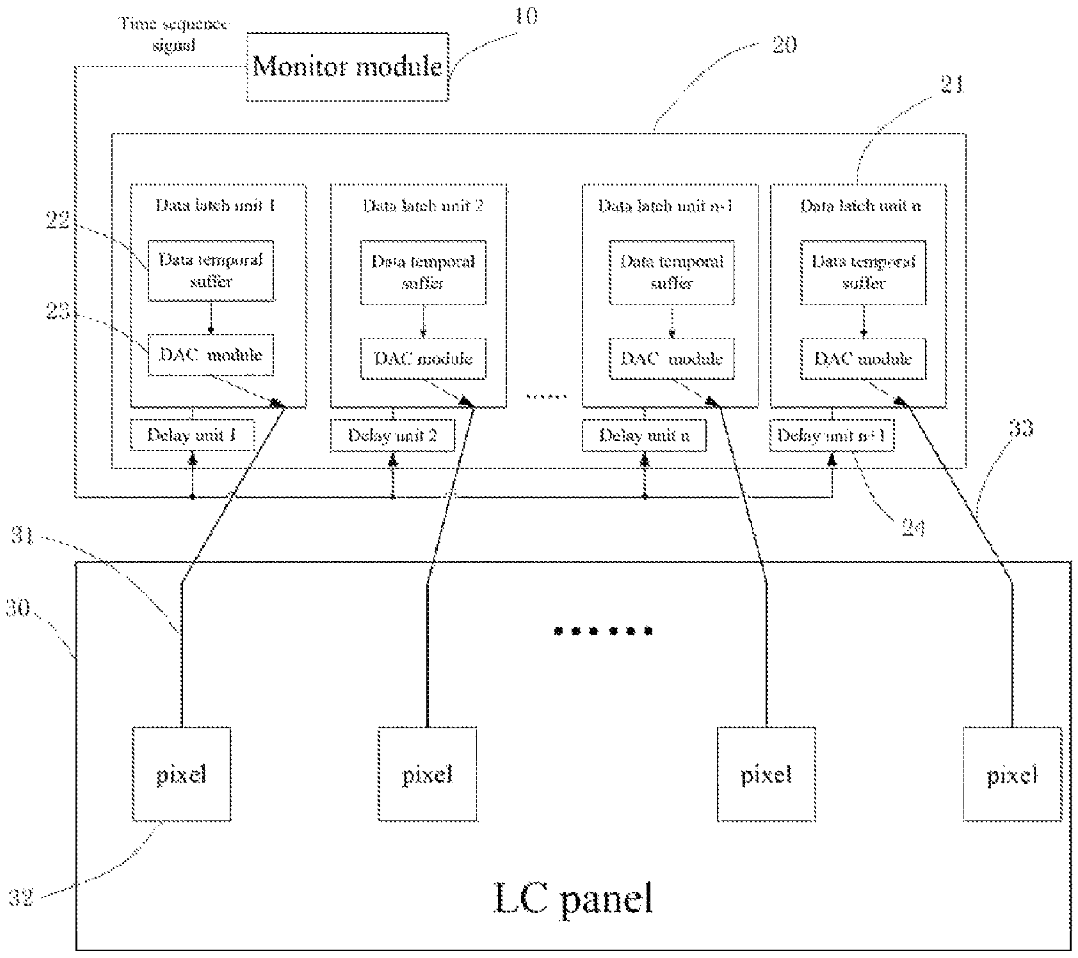
FIG. 4 is a schematic diagram of a first example of the present disclosure.

As shown in FIG. 4, the LC panel device of the present disclosure comprises the driving circuit of the LC panel 30. The LC panel 30 comprises a plurality of the data lines 31 and a plurality of the leads 33 connected to the data lines 31, the driving circuit of the LC panel comprises the data-driving module 20 coupled to the data line 31 and a monitor module 10 coupled to the data-driving module 20. The data-driving module 20 comprises the delay unit 24, and the data latch unit 21 coupled to the lead 33, the monitor module 10 outputs the time sequence signal to control the data latch unit 21 to output the display signal to the data line 31, where the time sequence signal is sent to the data latch unit 21 through the delay unit 24. When the delay unit 21 reaches a preset delay time, the delay unit controls the data latch unit 21 to output the display signal to a corresponding data line 31, where a delay time of a delay unit 24 coupled to a long lead 33 of the LC panel is less than a delay time of a delay unit 24 coupled to a short lead 33 of the LC panel. The data latch unit 21 comprises a data temporary register 22 and a digital-to-analog converter (DAC) module 23 coupled to the data temporary register 22, the DAC module 23 converts the display signal into an analog signal, and outputs the analog signal to the corresponding data line 31. When the time sequence is at a high level (logic 1), the data temporary register 22 sends the display signal to the DAC module 23, and when the time sequence is at a low level, the DAC module 23 outputs a converted display signal to the corresponding data line 31.

A pixel 32 of the LC panel 30 is coupled to the data line 31 of the LC panel 30, the delay unit 24 controls the display signals output by the data latch units 21 to simultaneously reach the same row of pixels of the LC panel, which avoids the delay of the display signal and improves display quality.

Data of each of all channels of an ordinary data-driving module is simultaneously outputted, namely display signal of each of all data latch units is simultaneously sent to the data lines, as shown in FIG. 2. If the data-driving module has 2n number of output channels, an nth output channel is the nearest channel from a data column, and an impedance of an nth lead reaching the data column is the smallest, left and right leads of the nth lead are symmetrically arranged, the impedances of the left and right leads are symmetrical and gradually increase from the nth lead to the leads at two ends. As the impedance of the lead increases, the delay time of the display signal reaching the data line of the LC panel increases correspondingly, and a charging time of the data column corresponding to the LC panel is reduced correspondingly. The present disclosure singly controls the output channel of the data chip.

Figure 5:
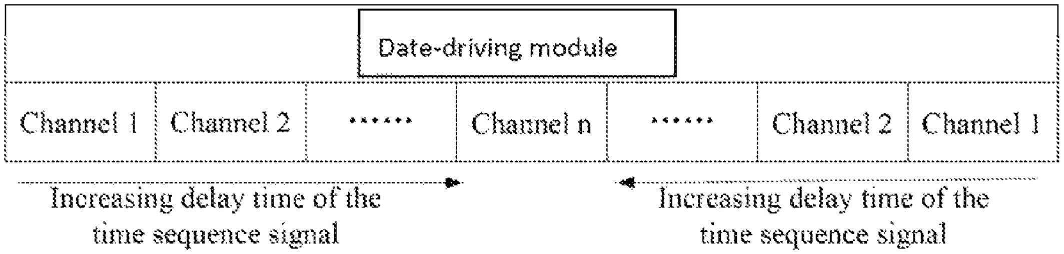
FIG. 5 is a schematic diagram of a delay of a time sequence signal of a first example of the present disclosure.
Figure 6:
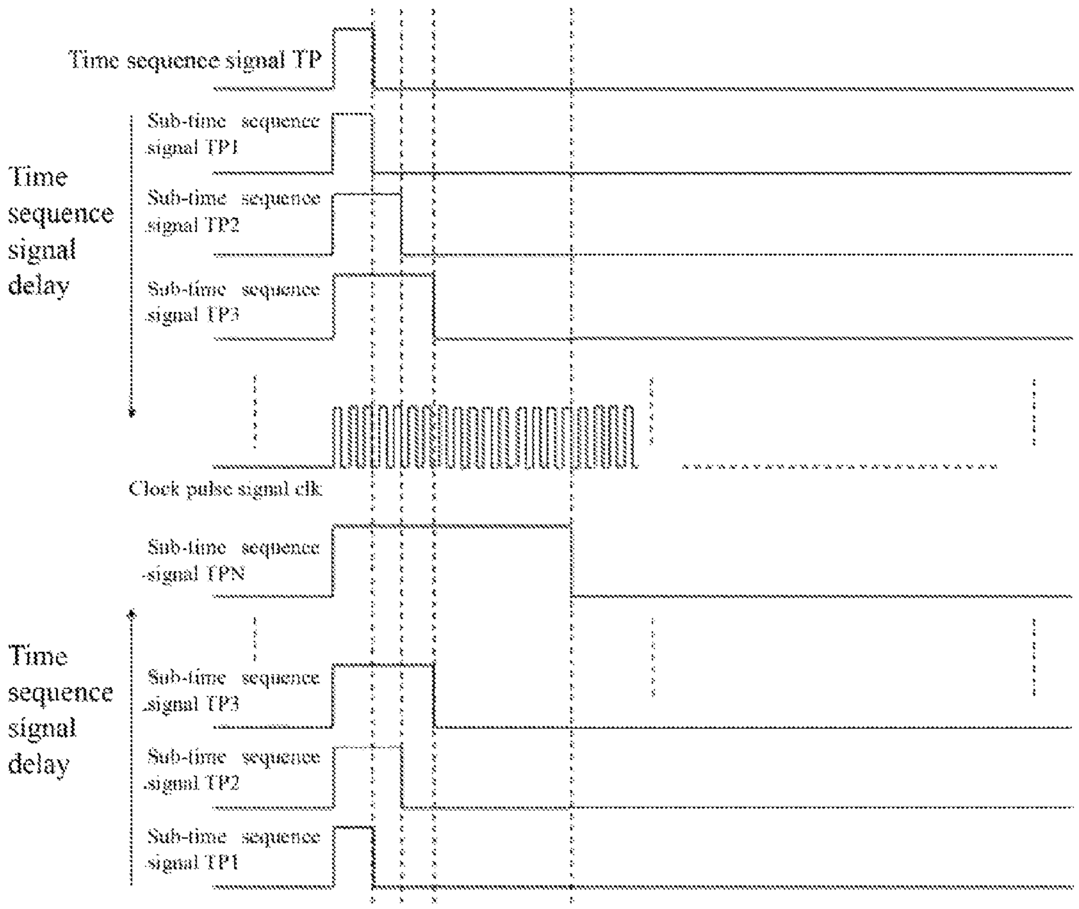
FIG. 6 is a schematic diagram of a waveform of a time sequence signal and sub-time sequence signal of a first example of the present disclosure.
Figure 7:
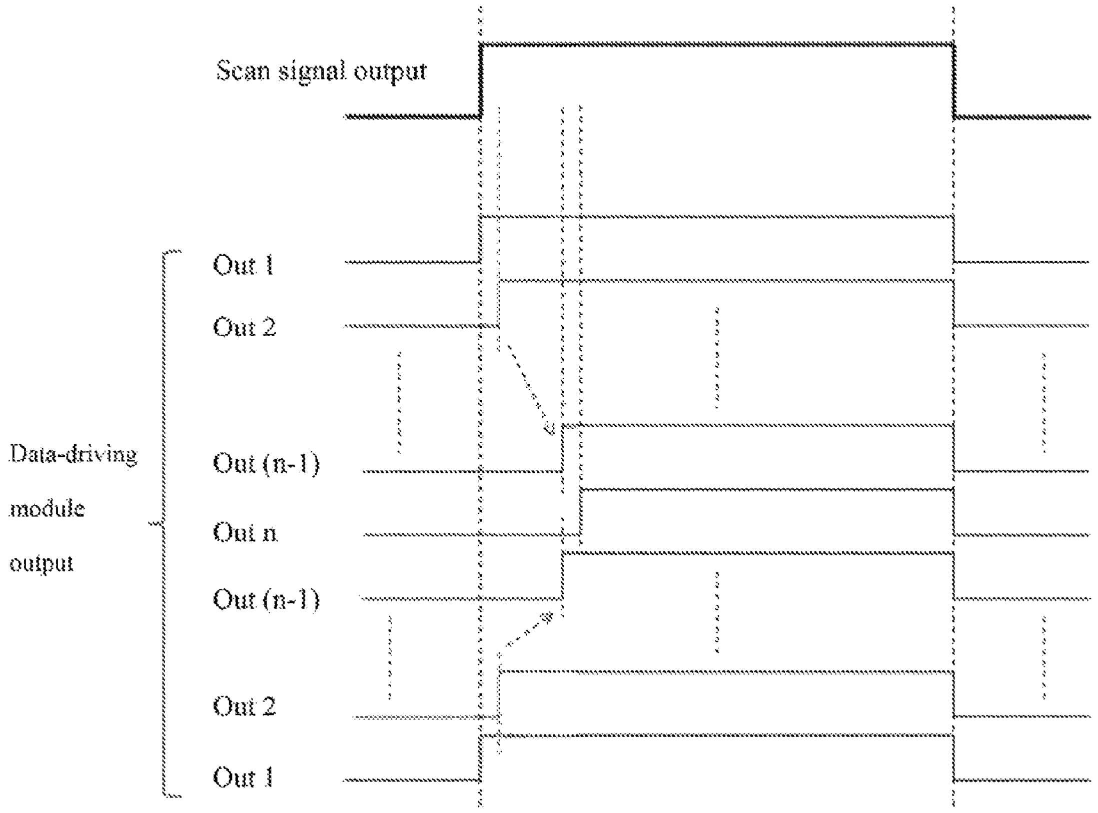
FIG. 7 is a schematic diagram of a waveform output by a data-driving module of a first example of the present disclosure.

As shown in FIG. 5 and FIG. 6, according to the time sequence signal TP sent by the monitor module, the data-driving module generates a sub-time sequence signal TP1-N corresponding to each of the output channels. Falling edges of the time sequence signals TPs are successively delayed from two ends of the LC panel to a middle of the LC panel, namely the delay times of the delay units successively increase from two ends of the LC panel to the middle of the LC panel, and an output of the display signal corresponding to an area of the LC panel is delayed (as shown in FIG. 7), thus charging times of the pixels of all areas of the LC panel are consistent through adjusting delay of a falling edge of a corresponding sub-time sequence signal, which avoids nonsynchronous signal delays caused by different impedances.

Figure 8:
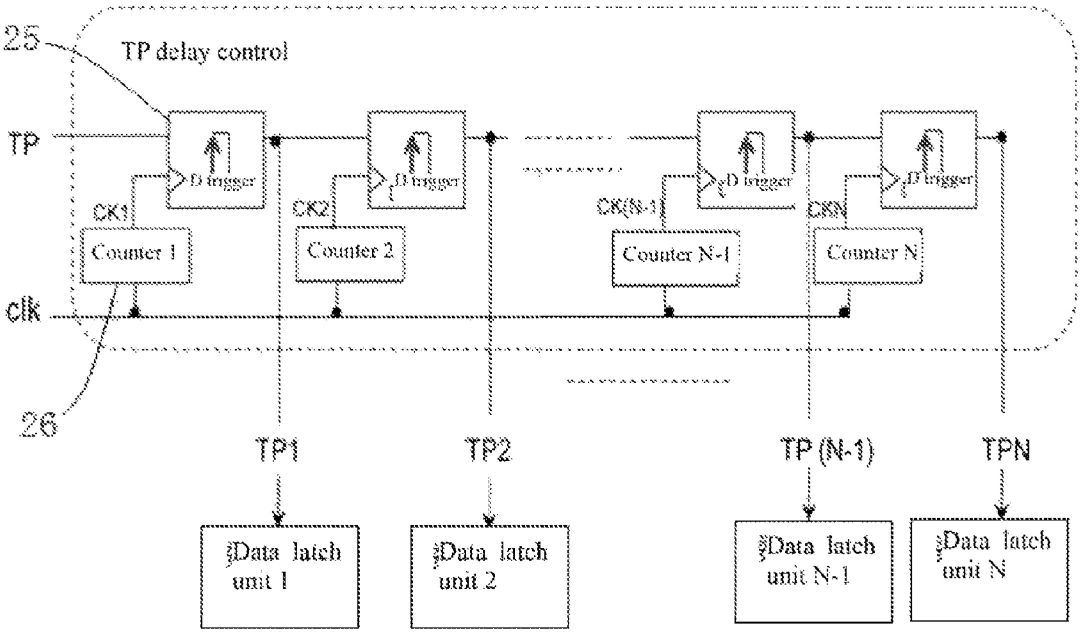
FIG. 8 is a schematic diagram of a circuit of a delay unit of a first example of the present disclosure.

As shown in FIG. 8, the delay unit comprises a plurality of cascaded D triggers 25, where an output end of each of the D triggers 25 is coupled to the data latch unit and is coupled to an input end of a next D trigger 25. The delay unit further comprises a counter 26 corresponding to the D trigger 25, a unified clock pulse signal clk is sent to a triggering end of the D trigger 25 through the counter 26, when the time sequence signal is at the high level, the D triggers of different grades successively generate the time sequence signal according to a frequency of the clock pulse signal clk. Pulse signals CK1-CKN of the triggering end of the D trigger may be generated by the clock pulse signals clks correspondingly passing through the counter 1-the counter N, thus different pulse signals CKN may be generated by changing the counter 26, and the time sequence signals TP1-TPN having different delay times are generated. The D trigger delays outputting signal, has good following performance, and is beneficial to reduce low cost, the delay output time of the D trigger may be freely set through the counter.

EXAMPLE 2

Figure 9:
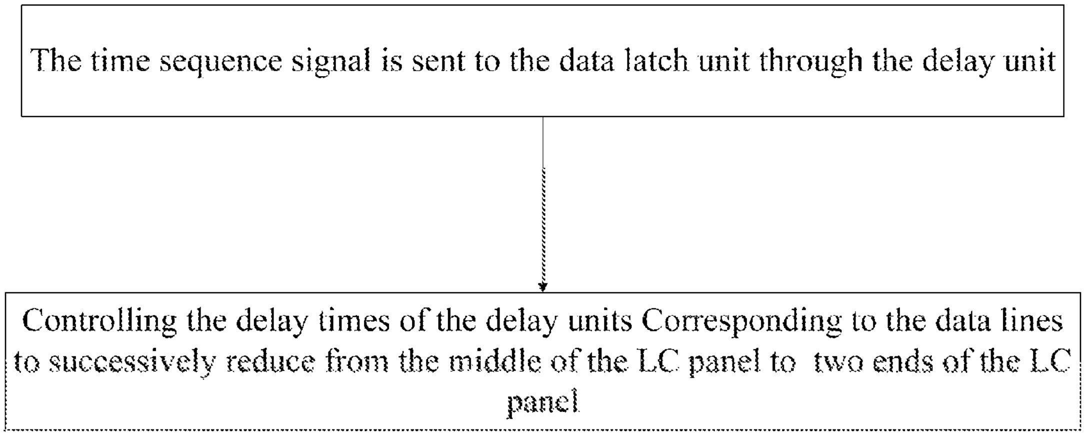
FIG. 9 is a flowchart of a method of a second example of the present disclosure.

As shown in FIG. 9, a second example provides a method for driving a driving circuit of a liquid crystal (LC) panel of the present disclosure, comprising:

A: sending a time sequence signal of a monitor module to a data latch unit through a delay unit; and B: converting the time sequence signal into a low level signal, sending the time sequence signal to the data latch unit, and controlling the data latch unit to output a display signal to a corresponding data line by the delay unit when the delay unit reaches a preset delay time, and a delay time of the delay unit coupled to a long lead of the LC panel is less than a delay time of the delay unit coupled to a short lead of the LC panel.

To further reduce the signal delay and improve the display quality, the step B comprises: controlling the delay time of the delay unit, and controlling display signals output by all data latch units to simultaneously reach a same row of pixels of the LC panel.

The delay unit of the second example may use the D trigger. The specific control circuit and the method refer to the first example.

The present disclosure is described in detail in accordance with the above contents with the specific exemplary examples. However, this present disclosure is not limited to the specific examples. For the ordinary technical personnel of the technical field of the present disclosure, on the premise of keeping the conception of the present disclosure, the technical personnel can also make simple deductions or replacements, and all of which should be considered to belong to the protection scope of the present disclosure.

We claim:

1. A driving circuit of a liquid crystal (LC) panel, the LC panel,the LC panel comprising a plurality of data lines and a plurality of leads connected to the data lines, the driving circuit comprising:

a monitor module;

a data-driving module comprising a data latch unit coupled to the lead of the LC panel; and a delay unit corresponding to the data line;

wherein the monitor module outputs a time sequence signal to control the data latch unit to output a display signal to the data line, and the time sequence signal is sent to the data latch unit through the delay unit; when the delay unit reaches a preset delay time, the delay unit controls the data latch unit to output the display signal to a corresponding data line; wherein length of the lead of the LC panel is inversely proportional to a delay time of the corresponding delay unit, wherein the delay unit comprises a plurality of cascaded D triggers and counter corresponding to each D trigger; an output end of each of the D triggers is coupled to one data latch unit, and is coupled to an input end of a next D trigger; a same clock pulse signal is sent to a triggering end of the D trigger through the counter.

2. The driving circuit of the LC panel of claim 1, wherein a pixel of the LC panel is coupled to the data line of the LC panel, and the delay unit controls the display signals output by all data latch units to simultaneously reach a same row of pixels of the LC panel.

3. The driving circuit of the LC panel of claim 1, wherein the data latch unit comprises a data temporary register and a digital-to-analog converter (DAC) module coupled to the data temporary register; the DAC module converts the display signal into an analog signal and outputs the analog signal to the corresponding data line.

4. The driving circuit of the LC panel of claim 3, wherein when the time sequence signal is at a high level, the data temporary register sends the display signal to the DAC module; when the time sequence signal is at a low level, the DAC module outputs a converted display signal to the corresponding data line.

5. A liquid crystal (LC) panel device, comprising:

a driving circuit of the LC panel;

wherein the LC panel comprises a plurality of data lines and a plurality of leads connected to the data lines; the driving circuit comprises a monitor module, a data-driving module comprising a data latch unit coupled to the lead of the LC panel, and a delay unit corresponding to the data line; the monitor module outputs a time sequence signal to control the data latch unit to output a display signal to the data line;

wherein the time sequence signal is sent to the data latch unit through the delay unit; when the delay unit reaches a preset delay time, the delay unit controls the data latch unit to output the display signal to a corresponding data line; wherein length of the lead of the LC panel is inversely proportional to a delay time of the corresponding delay unit,wherein the delay unit comprises a plurality of cascaded D triggers and a counter corresponding to each D trigger;an output end of each of the D triggers is coupled to one data latch unit, and is coupled to an input end of a next D trigger; a same clock pulse signal is sent to a triggering end of the D trigger through the counter.

6. The LC panel device of claim 5, wherein a pixel of the LC panel is coupled to the data line of the LC panel, and the delay unit controls the display signals output by all data latch units to simultaneously reach a same row of pixels of the LC panel.

7. The LC panel device of claim 5, wherein the data latch unit comprises a data temporary register and a digital-to-analog converter (DAC) module coupled to the data temporary register, the DAC module converts the display signal into an analog signal, and outputs the analog signal to the corresponding data line.

8. The LC panel device of claim 7, wherein when the time sequence signal is at a high level, the data temporary register sends the display signal to the DAC module; when the time sequence signal is at a low level, the DAC module outputs a converted display signal to the corresponding data line.

9. A method for driving a driving circuit of a liquid crystal (LC) panel, the LC panel comprising a plurality of data lines, the driving circuit of the LC panel comprising a data-driving module coupled to the data line and a monitor module coupled to the data-driving module, the data-driving module comprising a delay unit and a data latch unit, the data latch unit corresponding to the data line; the method, comprising:

A: sending a time sequence signal of the monitor module to the data latch unit through the delay unit; and B: converting the time sequence signal into a low level signal, sending the time sequence signal to the data latch unit by the delay unit, and controlling the data latch unit to output a display signal to a corresponding data line when the delay unit reaches a preset delay time, and wherein length of the lead of the LC panel is inversely proportional to a delay time of the corresponding delay unit, wherein the delay unit comprises a plurality of cascaded D triggers and a counter corresponding to each D trigger; an output end of each of the D trigger is coupled to one data latch unit, and is coupled to an input end of a next D trigger; a same clock pulse signal is sent to a triggering end of the D trigger through the counter.

10. The method for driving the driving circuit of the LC panel of claim 9, wherein the step B comprises: controlling the delay time of the delay unit, and controlling display signals output by all data latch units to simultaneously reach a same row of pixels of the LC panel.

11. The method for driving the driving circuit of the LC panel of claim 9, wherein the step B comprises: using a D trigger to control the delay time.

* * * * *